Figure 7:
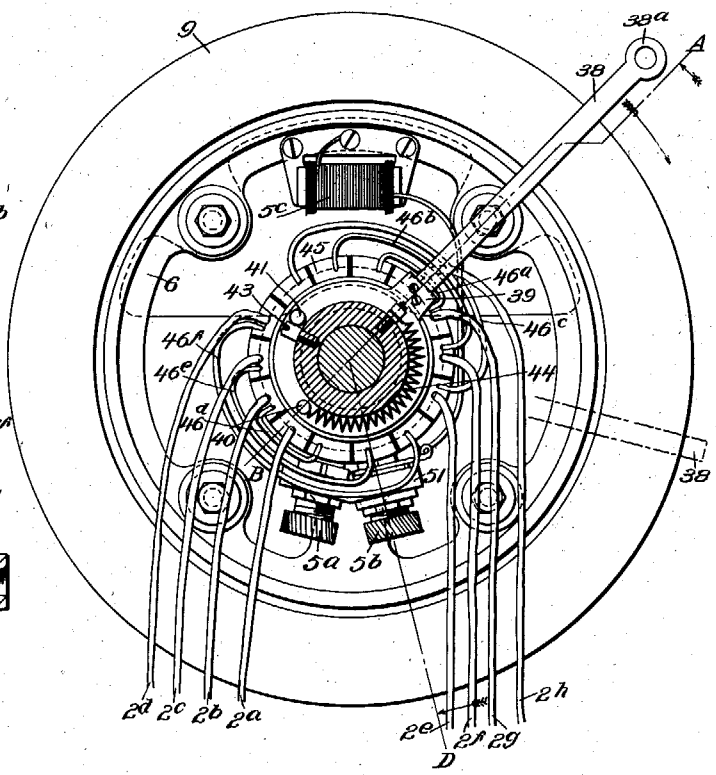

No. 12,356. REISSUED JUNE 13, 1905.
B. O. WAGNER.
RECIPROCATING ELECTRIC ENGINE.
APPLICATION FILED APR. 20, 1905.
3 SHEETS—SHEET 1.
Fig. 3.
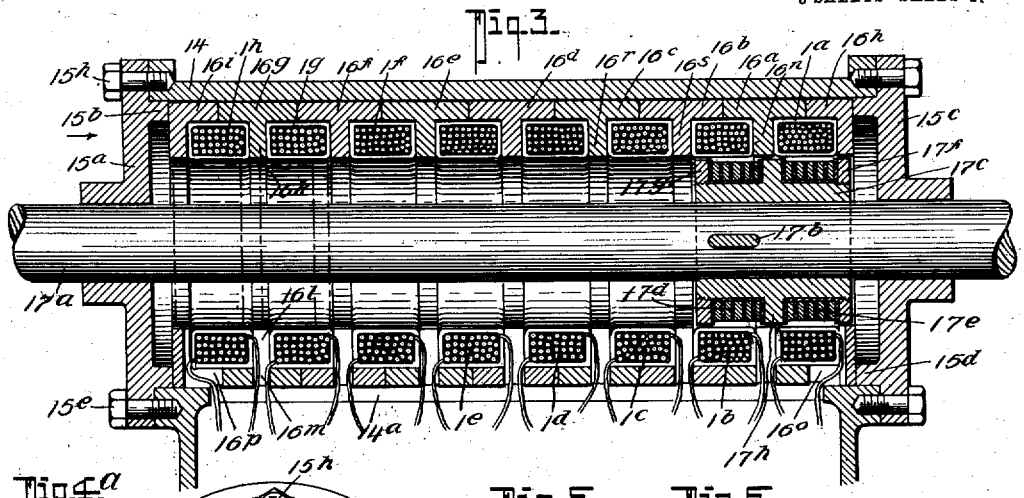
Fig. 4a
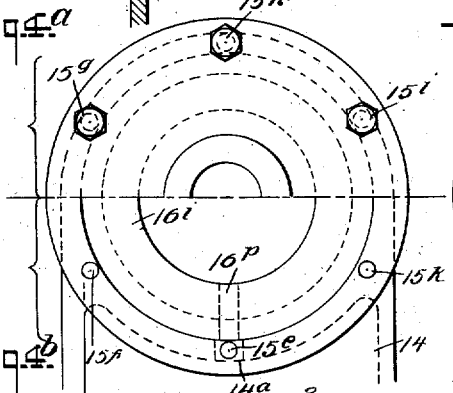
Fig. 5.
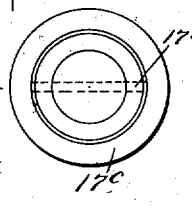
Fig. 6.
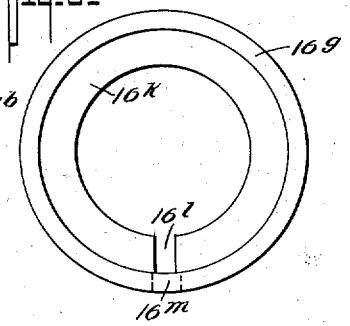
Fig. 4b
Fig. 2.
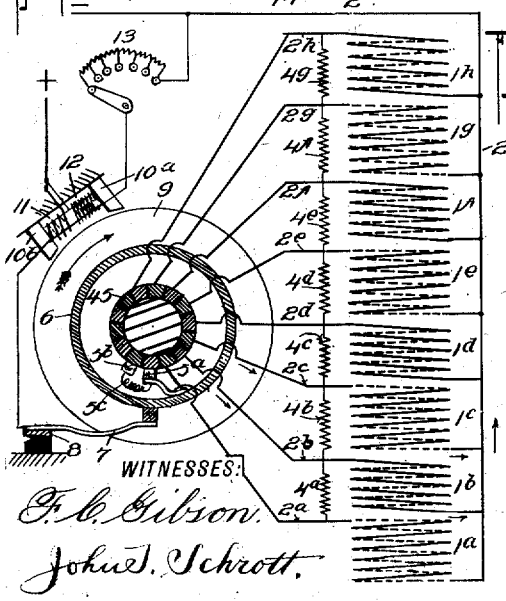
Fig. 1.
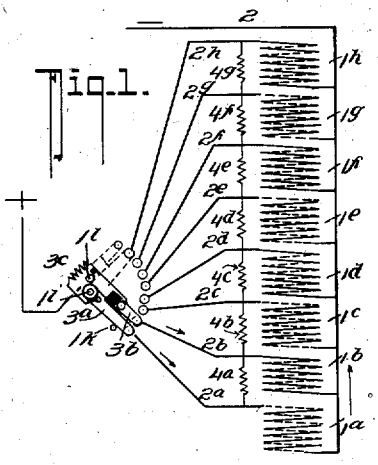
WITNESSES:
F. L. Gibson.
John T. Schrott.
INVENTOR
B. Otto Wagner.
BY
Fred G. Dieterich & Co.
ATTORNEYS No. 12,356. REISSUED JUNE 13, 1905.

B. O. WAGNER.

RECIPROCATING ELECTRIC ENGINE.

APPLICATION FILED APR. 20, 1905.

3 SHEETS—SHEET 2.

WITNESSES:

F. C. Gibson.

John T. Schott.

INVENTOR

B. Otto Wagner.

BY

Fred G. Dieterich & Co

ATTORNEYS

No. 12,356. REISSUED JUNE 13, 1905.
B. O. WAGNER.
RECIPROCATING ELECTRIC ENGINE.
APPLICATION FILED APR. 20, 1905.
3 SHEETS—SHEET 3.
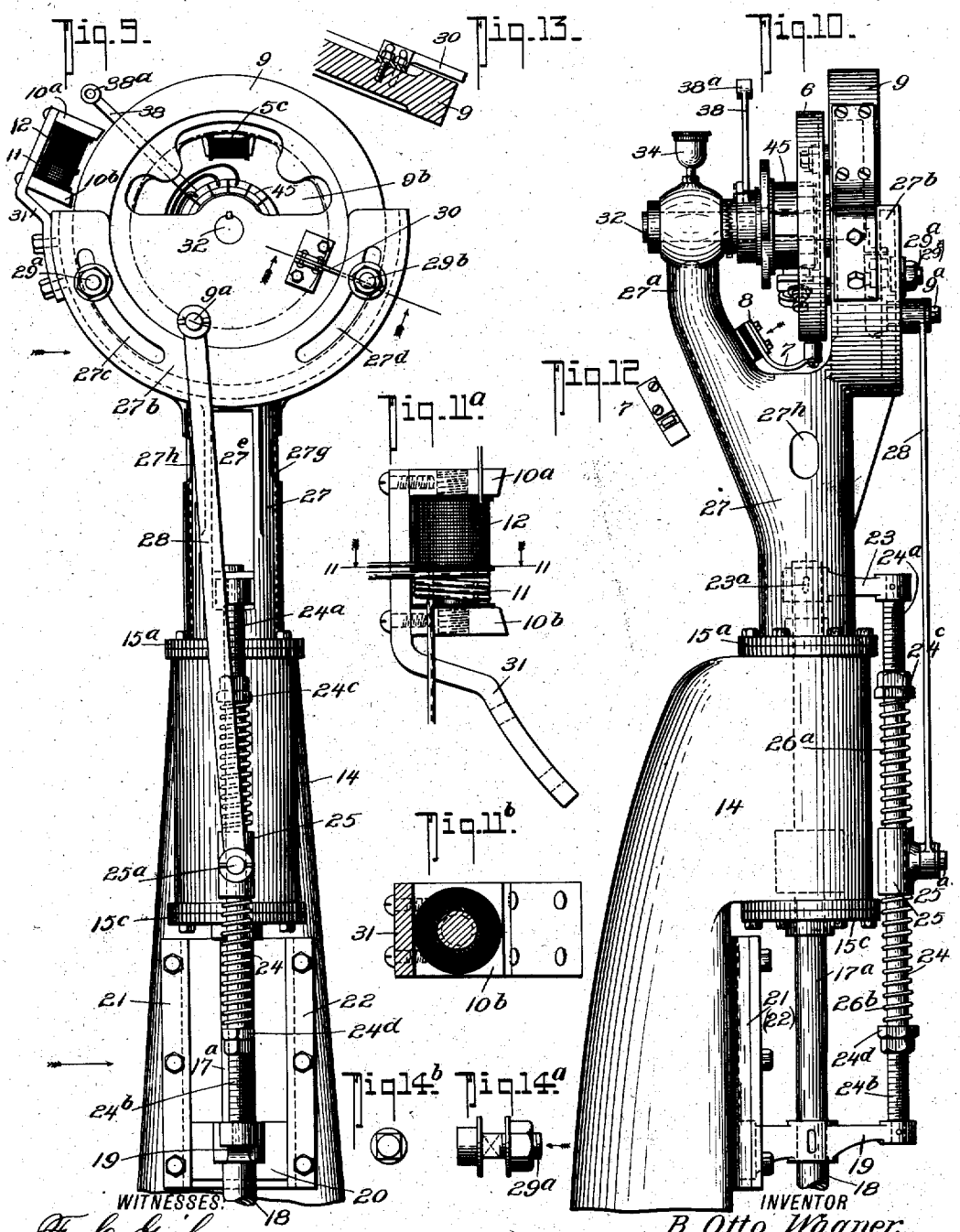
WITNESSES.
F. C. Gilson.
John T. Schrott.
INVENTOR
B. Otto Wagner.
BY
Fred G. Dieterich & Co.
ATTORNEYS No. 12,356. Reissued June 13, 1905.

UNITED STATES PATENT OFFICE.

BRUNO OTTO WAGNER, OF EL PASO, TEXAS.

RECIPROCATING ELECTRIC ENGINE.

SPECIFICATION forming part of Reissued Letters Patent No. 12,356, dated June 13, 1905.

Original No. 783,001, dated February 21, 1905. Application for reissue filed April 20, 1905. Serial No. 256,685.

*To all whom it may concern:*

Be it known that I, BRUNO OTTO WAGNER, a citizen of the United States, residing at El Paso, in the county of El Paso and State of Texas, have invented certain new and useful Improvements in Reciprocating Electric Engines, of which the following is a specification.

My invention relates to improvements in reciprocating electric engines; and its primary object is to provide means for employing an ordinary continuous current from a suitable source to produce an oscillating primary magnetic field of a solenoid-magazine and to use said magnetic field for setting a piston-like armature in a reciprocal axial motion to develop mechanical power in both directions. On the other hand, said oscillating magnetic field is to excite a counteracting magnetic field in the moving armature when the same is retarded in its velocity by mechanical load.

In its generic nature my present invention embodies a stationary magazine of solenoids and iron rings serially arranged in alternate succession inside of a metallic receptacle or housing and periodically excited to form an oscillating magnetic field, an iron armature with self-contained short-circuited solenoids not being supplied with current from an outside source, said armature describing a reciprocal motion within the solenoid-magazine under the action of the oscillating field, an oscillating switch or rotating controller for supplying the solenoid-coils with direct current in the way as mentioned above, said switch or controller being operated by a combination of mechanical members connected with the engine or separately by a suitable source of power—for instance, hand or foot power—means for regulating the speed especially required of engines with self-operated rotating controllers, and means for starting the engine.

In its more detail nature the oscillating magnetic field comprises a main and a supplemental magnet field portion, oscillatable in unison with one another, the supplemental field portion being of an opposite polarity to the main field portion.

Specifically, my invention consists of the novel construction and combination of parts, which will hereinafter be fully described, and particularly pointed out in the appended claims, reference being had to the accompanying drawings, in which—

Figure 8:
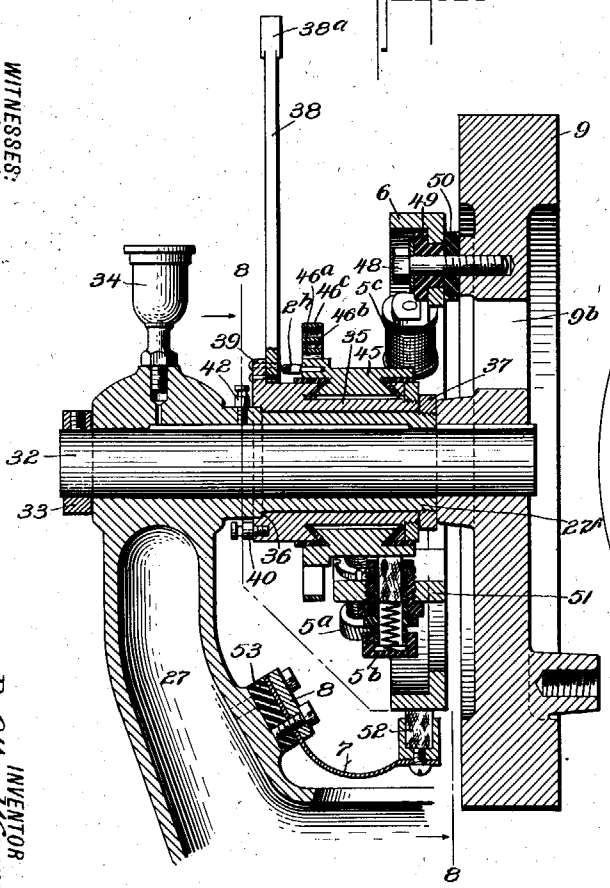

Figure 1 represents a wiring diagram of a reciprocating electric engine with an oscillating switch to be operated by hand or foot power. Fig. 2 exhibits a diagrammatic view of wire connections for an engine with a revolving controller, showing also the principle of the speed-regulating attachment. Fig. 3 is a longitudinal section through the mechanical-power-generating part of the engine, showing the magazine of the solenoids, its construction, and the armature. Fig. $4^a$ is a side view to Fig. 3 in arrow direction toward the cover $15^a$. Fig. $4^b$ is a side view to Fig. 3, the cover $15^a$ being removed and inner top ring-plate $16^i$ shown. Fig. 5 is a side view to the armature in Fig. 3. Fig. 6 is a side view to an intermediate ring-plate $16^g$ in Fig. 3. Fig. 7 is the rear view of a rotating controller with starting mechanism and cross-section on line 8 8 in the arrow direction of Fig. 8. Fig. 8 is a longitudinal section to Fig. 7, taken on the line A B C D and seen in the arrow directions. Fig. 9 is a front view of a reciprocating electric engine of vertical construction, representing an electrically-operated drop-forge hammer. Fig. 10 is a side view in right-angle and arrow direction to Fig. 9. Figs. $11^a$ and $11^b$ are detail views covering the speed-regulating device, Fig. $11^b$ being a section on the line 11 11 of Fig. $11^a$ faced in the arrow direction. Fig. 12 is a face view in arrow direction toward the slide-contact or brush-holder 7 in Fig. 10. Fig. 13 is a side elevation of the finger 30 in Fig. 9 seen in arrow direction. Figs. $14^a$ and $14^b$ represent in detail the adjustable stop-pin $29^a$ or $29^b$, as shown in Figs. 9 and 10, Fig. $14^a$ being the side view and Fig. $14^b$ a front view in arrow direction of Fig. $14^a$.

Referring now to the accompanying drawings, in which like numerals of reference indicate like parts in all of the figures, $1^a$ $1^b$ $1^c$ $1^h$ represent a number of solenoids of insulated copper wire, wherein $1^a$, $1^c$, $1^e$, and $1^g$ are wound in one direction and $1^b$, $1^d$, $1^f$, and $1^h$ in a direction opposite to them. Said solenoids are connected in a way that all ends of one side—for instance, their outer ends—join to the return-wire 2, while the other ends of the coils $2^a$ $2^b$ $2^c$ $2^h$ are connected either to a corresponding number of metallic contacts insulated from each other, as shown in Fig. 1, or to a number of mutually-insulated metallic segments, which form parts of a so-called "collector," as indicated in Fig. 2. Discussing first the diagram Fig. 1, the other pole of the current source, preferably the positive one, is in connection with the contact-lever $3^a$, which is fulcrumed in $1^l$ and limited in its amplitude by stationary or adjustable stop-pins $1^k$ and $1^l$. Fixed to the lever $3^a$, but at the same time electrically insulated in its joint, is an elastic contact-arm $3^b$, which is supplied with a current through the cross-connected resistance $3^c$. Steady resistances $4^a$ $4^b$ $4^c$ $4^g$ (in most cases being inductive resistances with a comparatively high ohmage) are further connected between the wire-leads from the different coils to the controller-contacts, as indicated in Figs. 1 and 2. Taking in view an initial position of the contact-lever $3^a$, the strongest current will flow from this lever through the first contact to the solenoid $1^a$ and produce there the maximum flux of lines of force. At the same time a branch current of less intensity from the lever $3^a$, through the resistance $3^c$, will pass the contact-arm $3^b$, the second contact-button, and create a magnetic field in the solenoid $1^b$ that is respectively weaker than the first one and of opposite polarity. Comparatively small currents will pass the resistance-bridges $4^a$ $4^b$ $4^c$, &c. When turning the lever $3^a$ counter-clockwise, the magnetic field in coil $1^a$ will disappear and excite in it an electromotive force of self-induction, which would cause a live spark at the metal contact and endanger the wire insulation of the coil unless there was a path $4^a$ open for its discharge. Continuing the movement of the contact-lever with a certain speed, a wave of lines of force will travel through all coils with a proportional linear velocity, and said wave will return its direction when the lever is moved backward.

In place of an oscillating switch a rotating arm with two brushes or slide-contacts $5^a$ and $5^b$, Fig. 2, may be used, of which $5^b$ is separated from its neighbor by an intermediate piece of insulating material, while electrically connected to $5^a$ by a resistance $5^c$, similar to that in Fig. 1. Said brushes are revolving around a drum of mutually-insulated metal segments 45, built up in the same way as a commutator of a direct-current dynamo. This "collector," as I prefer to call it, is kept in a fixed position when the engine is working, and its axis coincides with the fulcrum of the revolving brush-holder. The number of segments is equal to twice the number of solenoids minus two; but under special circumstances a larger number of segments may be taken. As Fig. 2 shows, the corresponding opposite segments on parallel chords are electrically connected to each other by insulated metal wires or strips, while the leading-in wires of the first and last solenoids are joined to segments which are lying on the symmetry line assumed at a right angle to the parallel chords and the segments second to last but one are wired *seriatim* to the intermediate solenoids. Like in Fig. 1, all endings of the different solenoids are combined with the common return-wire 2 of the electrical source. In solid combination with the brush-holder arm is a metallic ring 6, which when rotating receives current through the slide-contact 7, that is fastened stationarily to a metallic block 8, insulated from the frame of the machine. Ring 6 is attached to the fly-wheel 9, which is set in motion by the engine by means of mechanical devices, to be described hereinafter. When the fly-wheel 9 is revolving, the brushes $5^a$ and $5^b$ will send a current through the different coils and so produce a traveling magnetic field of the same character as explained heretofore. One revolution of the brush-holder means a full oscillation of the field in the solenoid-magazine, sparking at the brushes being reduced to a minimum by the compensating resistances $4^a$ $4^b$ $4^c$–$4^g$ between the leading-in wires of the coils. Before explaining the other details in Fig. 2 I rather discuss Fig. 3 next.

In a metallic housing 14 of preferably cylindrical shape and forming part of the engine are arranged a number of iron rings of a T-shaped rim cross-section $16^a$ $16^b$ $16^c$–$16^g$, and at both ends of this group iron rings with a ⌐-shaped-rim profile $16^h$ and $16^i$. The rings $16^a$ $16^b$ $16^c$–$16^g$ have each one a square opening in its rim—for example, $16^m$ in ring $16^g$—and an adjacent slot $16^l$ in its center web to allow sufficient space for the wire-leads of the coils. For the same purpose and in a similar way the rings $16^h$ and $16^i$ are also provided with suitable slots $16^o$ and $16^p$, and a long slot $14^a$ in the cylindrical housing 14 affords access for the outside wires to join the coil-leads. Figs. 3, $4^a$, $4^h$, and 6 designate the location of said openings and slots. Both ends of the housing 14 are covered by metallic plates $15^a$ and $15^c$ with inside projecting rims $15^b$ and $15^d$, respectively, to hold them in a central position to the housing and make them rest against the rings $16^i$ and $16^h$. A number of cap-screws in the housing—Figs. $4^a$ and $4^b$ indicate six of them—pass with clearance through holes in the covers and press the rings $16^a$ $16^b$ $16^c$–$16^i$ axially together, thereby securing good metallic contacts in all the joints. In the two covers $15^a$ and $15^c$ is centrally guided an iron or steel rod $17^a$, to which is fixedly secured by a flat key $17^b$ or similar means a piston-armature $17^c$, Figs. 3 and 5. In its specific nature said armature consists of a cylindrical iron body $17^c$, having a web $17^h$ in its center and iron flanges $17^f$ and $17^g$ screwed on each end. The outside diameter of the armature is kept a little smaller than the bore of the rings $16^a$ $16^b$–$16^i$, so as to form just a small air-space. The length of said armature is somewhat shorter than the axial measurement across the webs of a group of three rings—for instance, $16^h$, $16^a$, and $16^b$. The object of this arrangement is to moderate the impacts in the moment of starting and stroke-changing and secure a more steady running of the engine; but while I have shown and explained just this construction I desire it understood that I may use an armature of a length covering in the same proportion a group of more than three rings and having accordingly more partitions. The so-formed compartments between the armature webs or flanges are lined with an insulating material and then filled with flat copper rings which are separated from each other by interposed layers of a non-conducting material. These piles of copper rings, which are designated $17^d$ and $17^e$ in the drawings, answer the same purpose as short-circuited wire coils. Fig. 3 shows further the solenoids $1^a$ $1^b$ $1^c$–$1^h$ in their proper positions between the rings $16^a$ $16^b$ $16^c$–$16^i$, which take alternately north and south polarity when a current is flowing through the solenoids.

Suppose a current is sent through coil $1^a$, making $16^h$ a south pole and web $16^n$ a north pole, and at the same time through coil $1^b$ a somewhat weaker current, causing north magnetism in $16^n$ and south polarity in $16^s$. In the very instant when the circuit is closed the armature will undergo a repulsion toward the left on account of the magnetic counter-fields in its core induced by the circulation of opposite currents in the two short-circuited armature-coils. This armature movement is transmitted to the rotating controller, Fig. 2, and sets brushes $5^a$ and $5^b$ in contact with collector-segments, by which electric circuits are brought about through the solenoids $1^b$ and $1^c$, respectively; the strength of the field in coil $1^b$ is raised to its maximum, and a new field formed in coil $1^c$, with south magnetism in $16^s$ and a north pole in $16^r$. A further contemplation of the theory of operation will indicate that a rising and increase of strength, as well as progressive migration, of these primary fields will cause counteracting secondary fields in the armature, under which action the latter is finally propelled in a position as indicated by —.—. lines in Fig. 3. At the same time the brush-holder $5^a$ has made contact with a collector-segment that is connected with the wire $2^h$ of solenoid $1^h$, which consequently is fully energized. The restored energy in the revolving fly-wheel 9 will turn the brush-holders forward, and thus a wave of lines of force will travel progressively from solenoid $1^h$ to $1^a$, causing an armature-stroke to the right. A retardation of the velocity of the armature due to increase in mechanical load reacting on the rod $17^a$ will strengthen the magnetic counter-field in the armature-core and therewith the propelling force of the armature.

In order to control the speed, an electromagnetically-working device, which I prefer to call the "regulator," Fig. 2, has been attached fixedly to the frame of the engine on a suitable place close to the circumference of the fly-wheel. Specifically, the regulator consists of an H-shaped electromagnet with a soft-iron core and pole-plates $10^a$ and $10^b$, fastened on both ends of it. Said magnet-core carries two solenoids 11 and 12, one of them being in the main circuit of the engine, the other excited by a branch current taken across the main terminals of the engine, said branch current flowing in opposite directions through the coil, and so having a tendency to weaken the magnetic effect of the regulator. A suitable rheostat 13, to be operated by hand or engine-power by means of a fly-wheel governor, will regulate the intensity of this current. Assumed the engine is working and the rheostat 13 so adjusted that the strength of the magnetic field in 12 overweighs that of coil 11, the fly-wheel will revolve at a certain speed. When the number of revolutions becomes excessive, said regulator will exercise a braking effect toward the fly-wheel, due to the induction of eddy-currents in the massive iron rim of the wheel. On the other hand, when the mechanical load to the engine is increased the strengthened field in coil 11 will slightly compensate the magnetic field of coil 12, diminish the dragging effect of the regulator toward the fly-wheel, and thereby make it gain in speed. It is obvious that in order to get a properly-acting regulator the magnetic field in coil 12 must be considerably stronger than the field 11 at the heaviest load of the engine.

Figs. 9 and 10 exhibit an example of an upright construction of the reciprocating electric engine operating a drop-forge hammer, its head-piece supposed to be fastened to the extension end 18 of the rod $17^a$ in any practically-approved way. Parallel to this rod and solidly secured to it by two brackets 19 and 23 is a rod or bar 24, on which a slidable sleeve 25 is held in a balanced position between two helical springs $26^a$ and $26^b$. Said rod or bar 24 is provided with screw-threads $24^a$ and $24^b$ on both ends to a certain length toward the center, and the nuts $24^c$ and $24^d$, secured by counter-nuts, serve to adjust the tension of the springs $26^a$ and $26^b$. One side of the lower bracket 19 is shaped out to a guide-shoe 20, sliding in two guide-bars 21 and 22, which construction, however, is not intended to be authoritative for future designs of the engine, as any practically-approved execution may take its place. The same suggestion might apply to the top part 27, which is outlined in Figs. 9 and 10 as a hollow cast-iron piece comprising the bearing-arm $27^a$, the cover $15^a$, and the fly-wheel casing $27^b$, the column part 27 having in the front an oblong opening $27^e$, with ample dimensions for the movement of the bracket 23, and on its sides two oppositely-located smaller openings $27^h$ and $27^g$ for removing the key $23^a$ when separating the bracket 23 from the rod $17^a$. It even might be advisable in some cases to put fly-wheel and controller on another part of the engine when reduction of its height is required. As further shown in Fig. 10, a connecting rod or bar 28, fulcrumed on the stud $25^a$ of the sleeve 25 and pivoted on the pin $9^a$, is transmitting the reciprocating motion of the armature-rod to the fly-wheel 9, which is overbalanced in one section, so as to have a tendency to turn the connecting-rod out of the so-called "dead-center" position. For this purpose a portion $9^b$ has been removed from the web of the fly-wheel. In small reciprocating electric engines for operating stone-drills, chisels, &c., which are mostly working in different places and positions where an evenly-balanced fly-wheel has to be used, such engines are set in motion simply by giving a turn to the fly-wheel by hand before closing the electric circuit.

For a certain class of reciprocating engines, such as forge-hammers, a stroke adjustment will be necessary, and therefore provisions are made in Fig. 9 to limit the angle of oscillation of the fly-wheel. In the wheel-casing $27^b$ are two circularly-curved slots $27^c$ and $27^d$, in which the adjusting-bolts $29^a$ and $29^b$, Figs. $14^a$ and $14^b$, can be shoved in any position desired. The heads of these bolts, extending inside of the wheel-casing, as indicated by dotted lines in Fig. 10, form strike-pins, against which alternately dashes the elastic finger 30, Fig. 13, that is fixed to the fly-wheel by means of angle-pieces and screws or any other practical way. The object of this elastic finger is to act as a "buffer"—*i. e.*, to take up the impact due to the accumulated energy in the moving parts and repulse the fly-wheel, thereby turning the brush-holders $5^a$ and $5^b$ in opposite direction and reversing the armature-stroke.

In Figs. 9, $11^a$, and $11^b$ is further shown the way of fastening the speed-regulating device to the engine-frame. The electromagnet, as heretofore described, is screwed against a bracket 31 of non-metallic metal, which is fastened to the wheel-casing $27^b$.

Discussing now Figs. 7 and 8 and referring at the same time again to Figs. 9 and 10, the arm $27^a$ carries a long box-bearing $27^f$ for the revolving steel shaft 32, to which is keyed the fly-wheel 9 on one end and the collar-ring 33 on the other. Lubrication is supplied by an oil-cup 34 or any other suitable device in place of it. To the bearing extension $27^f$ is fitted the collector-sleeve 35, held in place by the shoulder 36 and the ring-nut 37. Said collector-sleeve is capable of being turned by a lever 38, that is fastened to it in 39, and has on its free end an eye $38^a$ to join a pull chain or cord to it. The total movement of the lever and collector-sleeve in the arrow direction of Fig. 7 amounts to about sixty degrees, to which angle it is limited by stop-pins 40 and 41, both being fastened to the collector-sleeve 35, while pin 43, against which said pins are striking, is screwed to the bearing. The final position of the lever movement is marked by —·—·—·— lines. A helical or spiral spring 44 is attached to the stop-pin 40 and hooked to the stud-screw 42 on the bearing, thereby holding the lever 38 in a position as indicated in Fig. 9. As already set forth, the engine under light mechanical load will set itself in motion immediately after closing the circuit; but in cases where heavy loads at the starting moment must be overcome it may be necessary to give a quick turn to the lever 38 in the arrow direction, thereby causing a relative rotation of the collector toward the brushes and starting a magnetic wave through the solenoid-magazine.

In its details the collector consists of segments 45, of copper or bronze, which are separated from each other and the sleeve 35 by a suitable insulating material in the same manner as in ordinary dynamo-commutators. Instead of arranging cord connectors inside of the collector, as diagrammatically indicated in Fig. 2, I practically would advise to use symmetrically-grouped curved metal strips $46^a$ $46^b$–$46^f$, well insulated from each other and joined to the proper collector-segments by binding-screws or soldering, as outlined in Figs. 8 and 9. The wire leads $2^a$ $2^b$ $2^c$–$2^h$ are exhibited as being soldered in the rear of the collector-segments, though any other approved mechanical way might do for the same purpose.

The metallic contact-ring 6 is fastened to the fly-wheel by a number of—for instance, four—cap-screws 48, every one being carefully insulated from the metal by a bushing 49 and washer 50, of hard fiber, micanite, or lava. Cast or mechanically joined to this ring is an angle-piece 51, in which is directly screwed the brush-holder $5^a$, while the brush-holder $5^b$ is insulated from it by a bushing of hard fiber, lava, or other non-conducting material. As to the brush-holders any simple and practically approved constructions as there are in the market now may be used, though I would consider that construction the best where a carbon block is guided in a metal casing and pressed radially against the collector by an adjustable spring. The resistance $5^c$ between both brush-holders consists of a coil of insulated resistance-wire wound upon a spool-frame of non-conducting material or insulated metal, which is fixedly attached to the ring 6 oppositely to the brush-holders in order to counterbalance the mass of the ring. One end of the resistance-wire is joined to the contact-ring 6, while the other is attached to the metal casing of the brush-holder $5^b$. The slide-contact 7 for feeding the ring 6 with current is a simple carbon brush 52, fastened to a spring built up of flat copper or phosphor-bronze strips, which is joined to the metallic terminal plate 8. Said terminal plate is screwed to a block 53 of non-conductive material, that is fastened to the engine-frame and insulates the brush-holder from the metal.

Having thus specifically described my engine, the main features on which my invention is based and has been gradually carried out are to work at a higher degree of efficiency than obtained with present systems and to afford this advantage without the use of special dynamos for producing pulsating current, to operate the apparatus with ordinary direct current taken from a lighting or power plant, the speed of strokes being practically independent on this current, and to fill a practically experienced gap in the line of electrical power-motors. I am aware that prior to my invention oscillating-field electric motors have been built. Therefore I do not broadly claim such a construction; but What I do claim as my invention, and desire to secure by Letters Patent, is—

1. In a reciprocating electric engine the combination of a metallically-inclosed magazine of solenoids and interposed iron rings that are to form magnetic poles, with an axially-reciprocating iron piston-armature inside of said solenoids and rings, said armature carrying groups of insulated copper rings, for the purposes specified.

2. In a reciprocating electric engine the combination of a metallically-inclosed magazine of iron rings and interposed solenoids forming periodically and in sequence actuated electromagnets, with a rotary controller as specified, to open and close progressively circuits through said electromagnets and reverse the direction of the oscillating field when the armature is to reverse its stroke.

3. In a reciprocating electric engine, comprising in combination with a magazine of iron rings and interposed solenoids being connected to form periodically magnetic fields in proper sequence but of alternate polarity, an iron armature with groups of insulated copper rings reciprocating inside of these solenoids to produce secondary magnetic fields of the same polarity as the primary ones, a controlling apparatus combined with said engine for the purpose of producing an oscillating primary field of specified characteristic from a common direct current, a number of compensating resistances joined across the leading-in wires of the solenoids to avoid sparking at the collector due to self-induction in the coils, and an electromagnetically-acting speed-regulating device, including a rheostat, as set forth.

4. In a reciprocating electric engine a metallic housing containing a magazine of iron rings and interposed solenoids, said housing in combination with two metallic end plates screwed to it for guiding the centrally-located and axially-moving armature-rod, said cover-plates provided with an inside projecting rim to lean against the outer magnet-rings and transmit the pressure of the screws to the contact-joints between the different inner rings.

5. In a reciprocating electric engine the combination of a piston armature and rod with a guiding device, means for transforming the reciprocal motion of said armature into circular motion for operating a rotary controller whereby elastic members are interposed to weaken the impact toward said controlling apparatus in the instant of the stroke return of the armature, and an energy-storing machine element compounded with said rotary controller for the purpose of overcoming its dead-center positions and equalizing its velocity or rebounding the controller from its final positions in case its movement has been limited to oscillation by mechanical means, as set forth.

6. In a reciprocating electric engine of the character stated, the combination of a fly-wheel-like energy-storing element with a metallic contact-ring, this ring electrically insulated from said machine element but fixedly secured to it and fed by an electric current through a stationary slide-contact, a group of radial brush-holders with elastically-adjustable carbon brushes fixed to said ring by suitable means, one of said brush-holders being directly fastened to that ring while the others are insulated from each other as well as from that ring, all brush-holders being connected in line to each other by suitable resistances and sliding upon a collector, as specified.

7. In a reciprocating electric engine of the character stated, a collector sitting on the extending cylindric portion of the bearing for the engine-governing apparatus, said collector consisting of mutually-insulated metal segments, the number of which to be equal to twice the total number of coils in the solenoid-magazine, minus two, said segments to be combined in a manner that insulated metallic strips are connecting but opposite segments on parallel cords supposed to be drawn through the collector, as specified.

8. In a reciprocating electric engine of the character described, the combination of a collector capable of being turned upon the extending portion of the bearing for the engine-governing apparatus by means of a lever fastened to said collector, with means to return said collector automatically to its initial position after said lever is released from the turning force, members attached to that lever to handle it from the operator's place, and stop-pins by which to limit the collector rotation, as specified.

9. In a reciprocating electric engine the combination of an energy-storing device including the revolving parts of the adjoined controller, with a stroke-adjusting device comprising two locally-adjustable pins with means for securing these pins fixedly to the engine-frame after their adjustment is made, and an elastic finger fastened to said energy-storing device, oscillating between said pins and serving as a rebuffing member when hitting these pins at the stroke return.

10. In a reciprocating electric engine of the character described, with a fly-wheel-like energy-storing device for operating its controller, the combination with a speed-regulating device consisting of an electromagnet fixedly secured to the engine-frame by interpolating a member of non-magnetic material, the poles of said electromagnet brought closely to the rim of said fly-wheel-like device so that a magnetic circuit is formed through it, said electromagnet carrying two independent wire coils of which one is traversed by the main current of the engine, the other fed by a branch current to be adjusted by a rheostat, for the purposes specified.

11. In a reciprocating electric engine, a plurality of successively-arranged field-coils, means for passing a current of one magnitude successively through said coils, one at a time, to energize the same, means for passing a current of another magnitude successively through said coils one at a time, in advance of the first-mentioned current, and an armature reciprocably movable through said coils by the action thereof, substantially as shown and described.

12. In a reciprocating electric engine, means for simultaneously producing an oscillating field of one intensity and a second field of another intensity, and an armature mounted to be reciprocated by the action of the said magnetic fields, substantially as shown and described.

13. In a reciprocating electric engine, means for simultaneously producing an oscillating magnetic field of one intensity and a counter-field of another intensity, and an armature mounted to be reciprocated by the action of the said magnetic fields, substantially as shown and described.

14. In a reciprocating electric engine, means for simultaneously producing an oscillating magnetic field and a secondary counter magnetic field, and an armature including a plurality of sets of energizing-coils adapted to receive energizing-current by induction from the said magnetic fields to reciprocate the armature, substantially as shown and described.

15. In a reciprocating electric engine, means for simultaneously producing an oscillating magnetic field of one intensity and a secondary counter magnetic field of another intensity, and an armature mounted for reciprocation by the action of the said magnetic fields, said armature having a plurality of sets of closed-circuit energizing-windings adapted to receive current by induction from said oscillating magnetic fields, substantially as shown and described.

16. In a reciprocating electric engine, means for simultaneously producing an oscillating magnetic field of one intensity and a second oscillating magnetic field of another intensity, and an armature mounted to be reciprocated by the action of the said magnetic fields, said armature including closed-circuit armature induction-rings, substantially as shown and described.

17. In a reciprocating electric engine, a series of field-coils arranged around a common axis, means for passing a current of one magnitude through one coil while simultaneously passing a current of another magnitude through the next succeeding coil of the series, and means for simultaneously shifting both of said currents successively into the succeeding coils and out of the preceding coils to produce an oscillating magnetic field, and an armature reciprocably mounted within said magnetic field for reciprocation thereby, substantially as shown and described.

18. In a reciprocating electric engine, a series of field-coils arranged around a common axis, means for passing a current of one magnitude through one coil while simultaneously passing a current of another magnitude through the next succeding coil of the series, and means for simultaneously shifting both of said currents successively into the succeeding coils and out of the preceding coils to produce an oscillating magnetic field, and an armature reciprocably mounted within said magnetic field, said armature including two sets of closed-circuit inductive armature-coils substantially as shown and for the purposes described.

19. In a reciprocating electric engine, a series of field-coils arranged around a common axis, means for passing a current of one magnitude through one coil while simultaneously passing a current of another magnitude through the next succeeding coil of the series, and means for simultaneously shifting both of said currents successively into the succeeding coils and out of the preceding coils to produce an oscillating magnetic field, and an armature reciprocably mounted within said magnetic field, said armature including a plurality of closed-circuit inductive armature-coils substantially as shown and for the purposes described.

20. In a reciprocating electric engine, a plurality of successively-arranged field-magnets, a rotary controller for progressively closing and opening circuits through said magnets to produce an oscillating magnetic field and for reversing the direction of said magnetic field at times, an armature mounted for reciprocation with and to be actuated by said oscillating field substantially as shown and described.

21. In a reciprocating electric engine, a series of successively-arranged field-coils, half of which are wound to produce a magnetic field of one polarity, the other half being wound to produce a magnetic field of an opposite polarity, means for successively energizing and deënergizing all of said coils to produce a shifting field of one intensity and for successively energizing and deënergizing all of said coils to produce a shifting field of another intensity in advance of said first energization, and a closed-coil armature operatable by and mounted to reciprocate within said field substantially as shown and described.

22. In a reciprocating electric engine, a series of successively-arranged field-coils, some of which are wound to produce a magnetic field of one polarity, the remainder of which being wound to produce a magnetic field of opposite polarity, means for successively energizing and deënergizing said coils to produce a shifting field of one intensity and for successively energizing and deënergizing all of said coils to produce a shifting field of another intensity in advance of the first energization, and a closed-coil armature operatable by and mounted to reciprocate with said fields, substantially as shown and described.

23. In a reciprocating electric engine, a series of successively-arranged field-coils, alternate coils of which are wound to produce magnetic polarity in the same direction, the other coils of the series being wound to produce a magnetic field with polarity in the opposite direction, means for successively energizing and deënergizing each of said coils with a current of one intensity and successively energizing and deënergizing each of said coils with a current of another intensity in advance of said first-mentioned energization to produce an oscillating magnetic field, and an armature operatable by and reciprocably mounted within said oscillating field, substantially as shown and described.

24. In a reciprocating electric engine, a series of successively-arranged field-coils, alternate coils of which are wound to produce magnetic polarity in the same direction, the other coils of the series being wound to produce a magnetic field with polarity in the opposite direction, means for successively energizing and deënergizing each of said coils with a current of one intensity and successively energizing and deënergizing said coils with a current of another intensity in advance of said first-mentioned energization to produce an oscillating magnetic field, and an armature operatable by and reciprocably mounted within said oscillating field, said armature including two sets of closed-circuit energizing-coils substantially as shown and described.

25. In a reciprocating electric engine, means for simultaneously producing an oscillating magnetic field of one intensity and a secondary oscillating magnetic field of another intensity, an armature having induction energizing-windings mounted to be reciprocated by action of said magnetic field, and an electromagnetic regulator coöperating with said armature substantially as shown and described.

26. In a reciprocating electric engine, a plurality of successively-arranged field-coils, a rotary controller for progressively closing and opening circuits through said coils to produce an oscillating magnetic field and for reversing the direction of said magnetic field at times, means connected with said coils for preventing static discharges between coil-terminals at the controller, and an armature mounted for reciprocation with and to be actuated by said oscillating field substantially as shown.

27. In a reciprocating electric engine, a plurality of successively-arranged field-magnets, a rotary controller for progressively closing and opening circuits through said magnets to produce oscillating magnet-fields and for reversing the direction of said magnetic field at times, said rotary controller including a commutator connected with each of said magnets, resistance-coils connected across the commutator-field-magnet connections to prevent arcing at the commutator, an armature wound for reciprocation within and to be actuated by said oscillating field, and an electromagnetic speed-regulator coöperative with said armature, substantially as shown and described.

28. In a reciprocating electric engine of the class described, a rotary controller comprising a commutator, a pair of contact-brushes in circuit with each other and adapted to engage adjacent segments of the commutator, a collector-ring, said brushes being in connection with said collector-ring, a third brush in engagement with said collector-ring and adapted to be connected to a source of electric energy and plurality of field-coils connected with the commutator-segments, each of said coils being also connected with each other and adapted to be connected to a source of electric energy and an armature mounted to be reciprocated by the energy of the field-coils, substantially as shown and described.

In testimony whereof I have signed my name to this specification in the presence of two subscribing witnesses.

BRUNO OTTO WAGNER.

Witnesses:
HARRY LEE EDWARDS,
GEORGE BLISH.